Feb. 27, 1945. E. H. WRIGHT 2,370,217
TURBINE TYPE ENGINE
Filed Sept. 22, 1941 4 Sheets-Sheet 1

INVENTOR
ELWOOD H. WRIGHT
BY Cook & Robinson
ATTORNEY

INVENTOR
ELWOOD H. WRIGHT
BY Cook & Robinson
ATTORNEY

Feb. 27, 1945.  E. H. WRIGHT  2,370,217
TURBINE TYPE ENGINE
Filed Sept. 22, 1941  4 Sheets-Sheet 3

INVENTOR
ELWOOD H. WRIGHT
BY Cook & Robinson
ATTORNEY

Feb. 27, 1945.  E. H. WRIGHT  2,370,217
TURBINE TYPE ENGINE
Filed Sept. 22, 1941  4 Sheets-Sheet 4
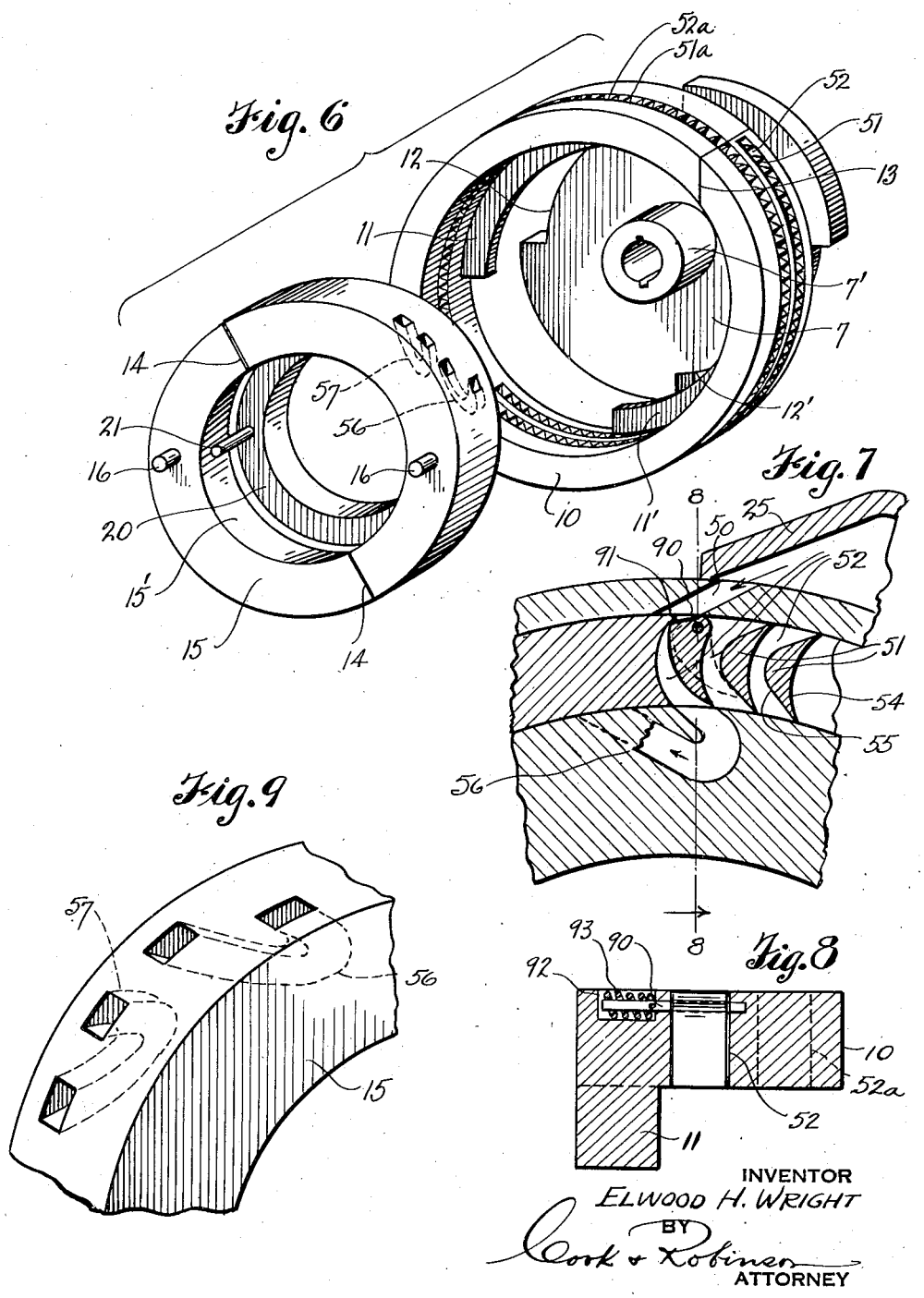
INVENTOR
ELWOOD H. WRIGHT
BY
Cook & Robinson
ATTORNEY Patented Feb. 27, 1945

2,370,217

UNITED STATES PATENT OFFICE 2,370,217

TURBINE TYPE ENGINE

Elwood H. Wright, Tacoma, Wash.

Application September 22, 1941, Serial No. 411,859

2 Claims. (Cl. 60—41)

This invention relates to improvements in internal combustion engines, and has for its principal object to provide an improved, turbine type of engine, equipped with a plurality of combustion chambers, circumferentially thereof and within which fuel charges may be compressed, and ignited in predetermined order and in synchronism with the movement of a rotor, and the force of the ignited charge directed against the impeller vanes of a rotor of novel form in such manner as to utilize the kinetic energy of the combusted fuel to the maximum extent for the driving of the rotor.

It is also an object of this invention to provide a rotor that acts as a valve for closing the discharge ports of the combustion chambers during the periods that the fuel charges are being compressed therein, and wherein there is a succession of bands of impeller vanes against which the ignited charges are progressively applied while the energy therein is being dissipated.

It is a further object of this invention to provide an engine of the above character wherein provision is made for automatic self-sealing of the joints between the combustion chambers and other relatively stationary parts, and the walls of the driven rotor to insure against any leakage or loss of efficiency resulting therefrom, yet without causing any undue drag on the rotor.

Another object of the invention is to provide an engine of simple construction, with few parts, and relatively inexpensive to manufacture.

Still further objects of the invention reside in the details of construction of parts comprised in the engine, in their combination, and in their mode of operation, as will hereinafter be fully described.

In accomplishing these and other objects of the invention, I have provided the improved details of construction, the preferred forms of which are illustrated in the accompanying drawings, wherein—

Fig. 6 is a perspective view of the rotor and associated parts, shown in disassembled relationship for better illustration.

Fig. 7 is a detail of a part of the rotor structure, showing the pivotally mounted impeller vane.

Fig. 8 is a cross section on line 8—8 in Fig. 7, illustrating a detail of the mounting of the pivoted impeller vane.

Fig. 9 is a perspective view, showing a detail of the rotor construction.

Figure 1:
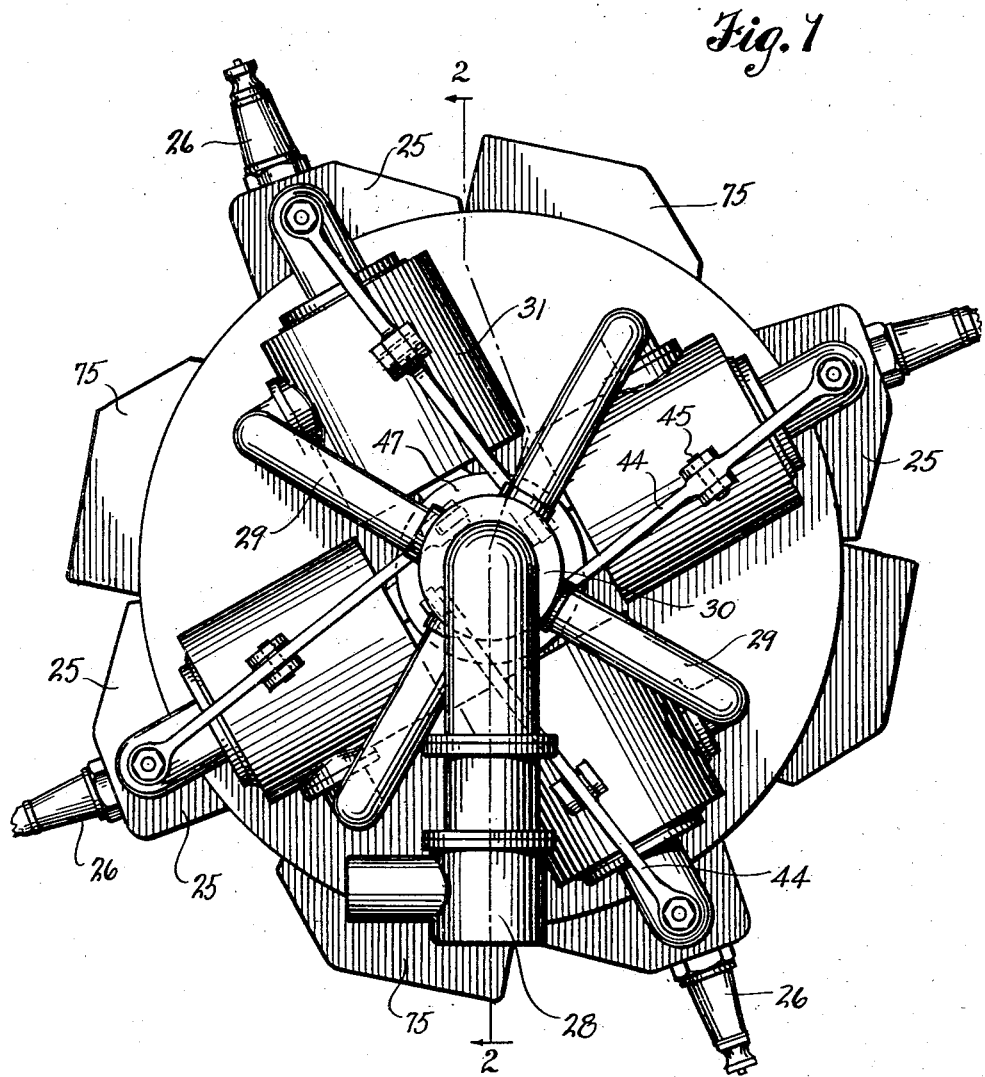
Fig. 1 is a view of one end of the engine, wherein the fuel supply means, manifolds, and compressors are illustrated.

Referring more in detail to the drawings—

In its present form of construction, the engine embodied by this invention comprises a cylindrical enclosing housing 1, closed at one end by a flat wall 2, here indicated as being integral with the cylindrical body, and closed at its other end by a removably applied wall 3, which may be held by bolts or other suitable means. Coaxially of the cylindrical housing, and extending rotatably through the end walls 2 and 3, is the engine drive shaft 4. This shaft is functionally and rotatably supported at opposite ends of the engine, in anti-friction bearings, designated at 5 and 5′ and which could be of any suitable kind other than shown. These bearings, as here shown, are fitted in housings 6 and 6′ formed on the outside faces of the wall plates 2 and 3 about the openings through which the shaft 4 passes.

Keyed on the shaft 4 within the housing 1 is a rotor assembly, comprising a disk-like body 7 equipped with an integral hub 7′ that receives the shaft and within which the shaft is keyed. This disk engages flatly against the wall plate 3, and about the peripheral portion of the disk is an annular body 10 in the nature of a cylindrical ring. This ring is of substantial thickness, radially of the engine, and has a width corresponding to the spacing of the end walls 2 and 3 of the housing to fit snugly between them. Also, the ring has diametrically disposed and inwardly directed flanges 11—11′ at one end adapted to register within correspondingly shaped sockets or recesses 12—12′ at the periphery of the disk 7 to provide an interlocked driving connection that causes the parts 10 and 7 to rotate together.

Figure 4:
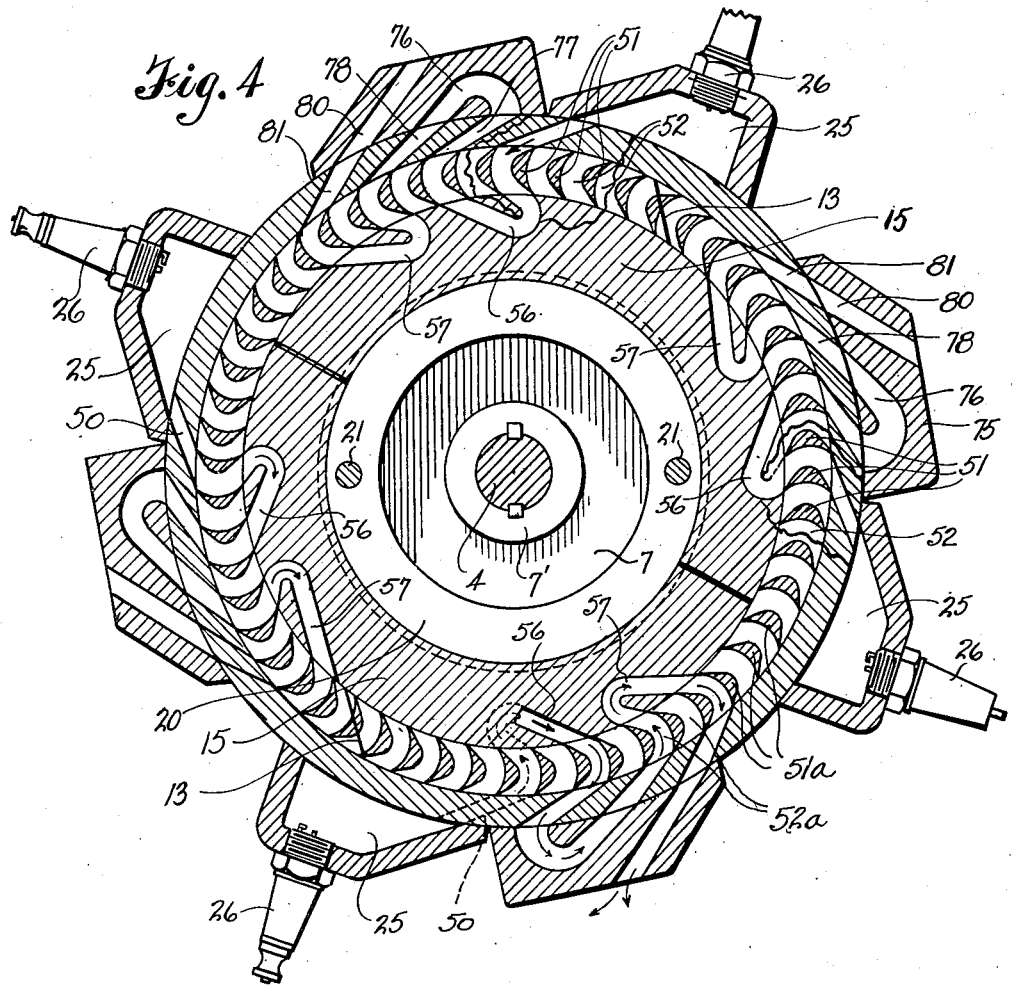
Fig. 4 is a cross sectional view taken on the line 4—4 in Fig. 2.
Figure 5:
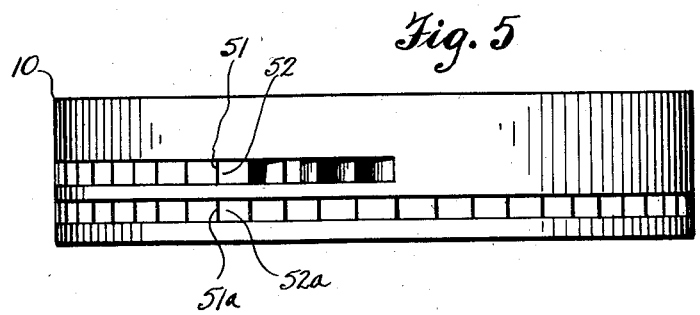
Fig. 5 is an edge view of the rotor member showing the offset bands of impeller vanes.

The outer surface of the rotor ring 10 is fitted to the interior cylindrical surface of the housing 1 in a gas-tight joint, and to prevent the possible binding of these two surfaces that might be due to the effects of high temperature in the engine, the ring 10 is divided into two or more segments, separated at the loose joints as indicated at 13 in Figs. 4 and 6.

Both the interior and exterior surfaces of the ring 10 are truly cylindrical, and located within the ring, and fitted to its interior surface is a non-rotating ring-like member 15 formed with a truly cylindrical outer surface and having a conically tapered interior surface 15'. This member 15 likewise is divided into a plurality of segments, as designated by the joints 14 in Fig. 6, and the ring is held against rotation in the housing by means of studs 16 extending thereon and passing outwardly through holes 17 in the housing end wall 2, as noted in Fig. 2.

Disposed within the ring-like member 15 is a spreader ring 20 having an exterior conically tapered surface fitted to the interior surface of the ring-like member 15. Fixed in the ring 20 are bolts 21 which extend therefrom, parallel to the axis of the drive shaft, and passing outwardly and slidably through holes 22 in the end wall 2. Surrounding the outer end portions of these bolts, are coiled springs 23 held under compression between the wall 2 and by nuts 24 threaded on the outer ends of the bolts. The function of these springs is to yieldingly pull the ring 20 outwardly or toward wall 2, thus to cause the exertion of spreading pressure against the inside surfaces of the segments of the divided ring-like member 15 to cause it to retain itself tightly against the ring 10 and the segments of the latter against the outer casing. The segmental construction of these parts permits expansion and contraction without detriment, and insures tightness of joints under all conditions.

Figure 2:
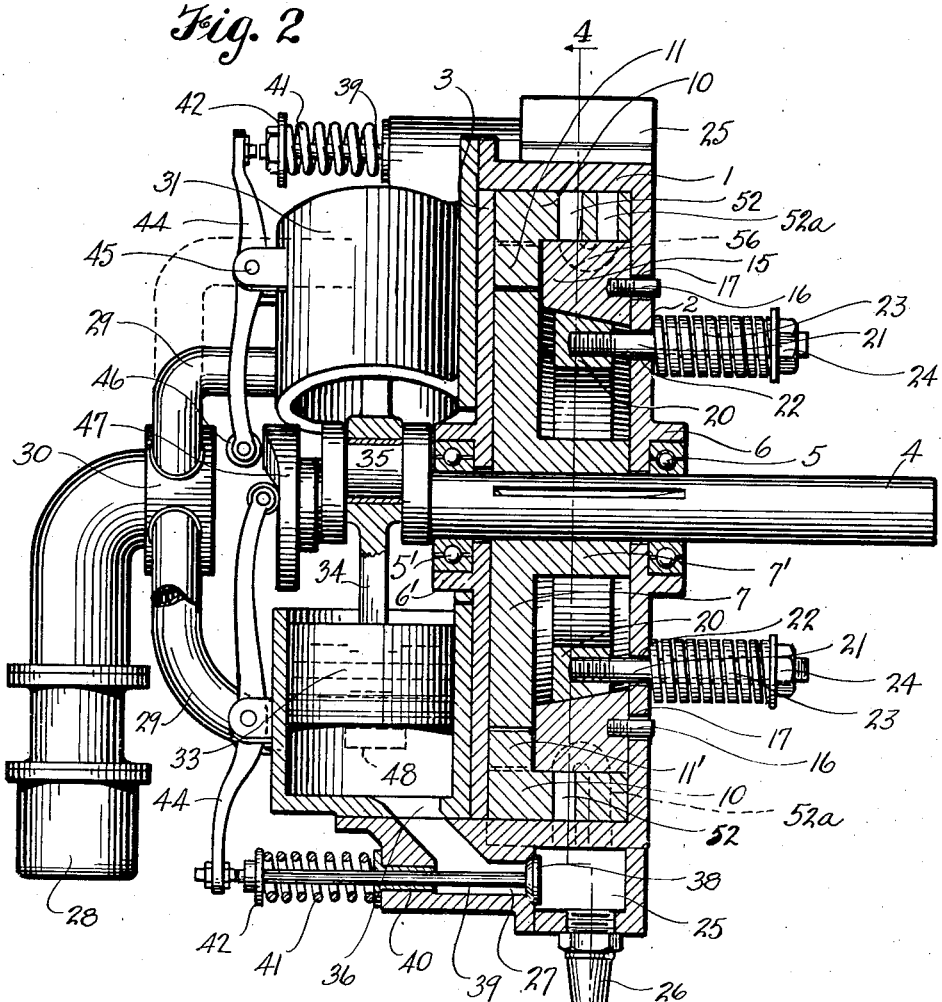
Fig. 2 is a cross section of the engine, substantially on the line 2—2 in Fig. 1.
Figure 3:
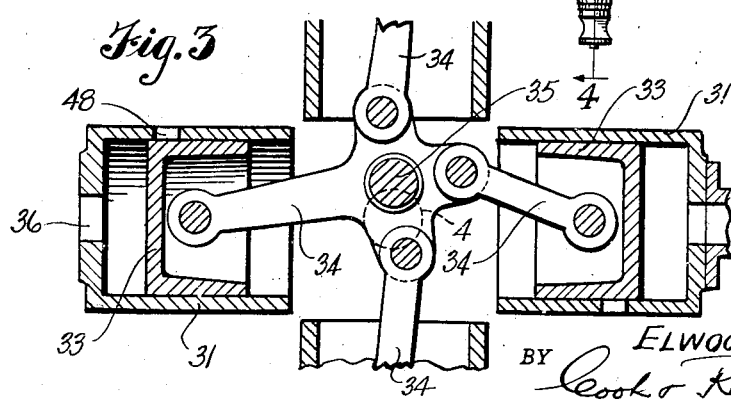
Fig. 3 is a sectional detail showing the means for and manner of connecting the pistons of the several compressor cylinders with a crank of the engine drive shaft.

Mounted on the casing 1, at regularly spaced intervals, here shown to be intervals of 90°, are explosion chambers 25, each like the other in its construction and use. Each chamber is equipped with a spark plug 26 and with a fuel inlet port 27. Fuel mixture is supplied to the various chambers 25 from a carburetor 28 through branch conduits 29 leading from a central manifold 30. Each branch 29 leads to a compressor cylinder 31 attached to the end plate 3, as seen in Fig. 2. The four cylinders are arranged in symmetrical spacing about the drive shaft, radially thereof and have open inner ends, and each is equipped with a piston 33. The several pistons are operatively connected by rods 34 with a crank throw 35 of the drive shaft 4 adjacent the outside of the wall 3.

Each compressor cylinder has an outlet passage 36 leading from its outer end to the port 27 of the corresponding combustion chamber 25, and each passage is equipped with a poppet valve 38 as best noted in Fig. 2. The valve head in each chamber, is mounted on a valve rod 39 that is slidable in a bushing 40 and extends to the side of the engine beyond the cylinders. Coiled springs 41 surround the outer end portions of the rods, and bear against seats 42 to yieldingly hold the valves closed. Each valve is designed to be opened by a rocker lever 44 which is pivoted on the wall of the corresponding cylinder as at 45, and has its inner end equipped with a roller 46 disposed for actuation by a cam 47 on the drive shaft and to be moved in proper timing according to rotation of the shaft and with the ignition of fuel charges in the combustion chambers.

The inlet ports 48 of the cylinders 31 are spaced substantially from the outer end walls and when a piston is actuated inwardly, it creates a partial vacuum in the cylinder. When the piston moves beyond the cylinder inlet port, a fuel charge is quickly drawn into the cylinder. On its outward travel, the piston drives this fuel charge under compression past the open poppet valve 38 into the combustion chamber, and, in proper timing, the charge is ignited. The ignition system is not herein shown but could be of the usual kind.

One of the important features of this invention resides in the novel and effective way in which the force of ignited fuel charges is utilized for driving the rotor. This is accomplished by and through the following means:

Opening from each explosion chamber 25, in a direction tangentially inclined with respect to the rotor ring 10, is a direct passage 50 through which the combusting gases of any ignited fuel charge escape from the explosion chamber to the rotor. Formed in the rotor ring 10, in position for registering alinement with the several passages 50, is a band of impeller vanes 51 spaced apart by passages 52 which open directly through the ring. This particular band of vanes and passages extends through an arc of 180° only.

Offset from the semi-circular band of passages in the axial direction of the rotor by extending about the ring 10 to its full circumference, is a second band of impeller vanes 51a, which likewise are spaced apart by passages 52a; it being understood that in each of the bands, the impeller vanes are equally spaced apart.

Each vane in the rotor has an arcuately concaved inner face 54, so directed or faced that in the rotation of the ring 10, this face will be directly impinged by the force of gas delivered from the chamber 25 through the passages 50. The opposite face 55 of each vane is quite convex. The passages 52 are all alike in size and direction relative to the axis of the ring, and each passage, due to the shape of the faces of the vanes, forms a sort of reverse bend, as will be readily understood by inspection of Figs. 4 and 7.

Formed in the ring-like member 15 at intervals corresponding to the angular spacing of the chamber 25, and directly in radial alinement with the inner ends of the passages 50, as seen in Fig. 7, are passages 56, of U-shape, forming reverse bends with the opposite ends of the passages, relatively offset to aline themselves respectively with the planes of the two bands of passages in the rotor ring 10. Thus, one end of each of the passages 56 will at all times be in registration with the circumferential band of vanes 51a and passages 52a, while the other end will periodically register with the semi-circular band of vanes 51 and passages 52 in accordance with the rotation of the rotor ring 10. Thus, it will be understood that the rotating ring 10, due to the unported portion extending through an arc of 180°, will operate as a valve to close off the outlet 50 from each explosion chamber 25 during a certain period for the compression of a fuel charge in the chamber.

It will here be mentioned that the timing or synchronizing of the rotor pistons and valves is such that compression of fuel charges in each cylinder and corresponding chamber 25 will take place during the interval that the passage 50 for that cylinder is closed. Ignition of the charge will take place just as the first passage 52 of the semi-circular band of passages comes into registration with the passage 50.

By referring again to Fig. 4, it will be observed also that somewhat advanced, ahead of each of the passages 56 in the ring-like member 15, are the reverse bend passages 57, which are like the passages 56 in direction and size, except that both ends of each of these passages is in registering alinement with the continuous band of passages and vanes of the rotor member.

It will be mentioned also that the spacing of the open ends of the passages 56 and 57 equals the spacing of alternate passages of the rotor ring 10. It is also shown in Fig. 4, that just beyond each of the explosion chambers 25, a block 75 is fixed on the housing. In each block there is a passage 76 of a return bend form, having its two ends opening directly toward the outside face of the housing 1, and in registering communication with inclined passages 77 and 78. These latter passages open entirely through the housing wall, and are inclined in the direction of rotation of the rotor with their inner ends alined with the plane of the continuous band of ports 52a of the rotor ring 10, and are so spaced that they will register with alternate passages 52a of the rotor.

In advance of the passages 77 and 78 of each block 75 is another similarly inclined passage 80 which opens to the outside of the block as an exhaust port. At its inner end, it communicates with a passage 81 through the housing wall, which latter passage registers with the plane of the continuous band of passages of the rotor, and is spaced forwardly of the inner end of the passage 78 so that these passages register with alternate passages through the rotor.

With the parts and passages so formed, it will be understood that an expanding, combusting fuel charge, after ignition in any explosion chamber 25, will be directed through the outlet passage 50 against the vanes 51 of the semi-circular band of passages, to impart rotary motion to the rotor. This expanding charge will continue, passing through the passages 52, between the vanes, into the corresponding return bend passage 56, and will then be directed outwardly against the vanes 52a in the continuous band of vanes and will again exert driving energy against the rotor. After passing through the rotor the second time, the expanding fuel charge will be directed outwardly through a passage 77, into the return bend 76 in the block 75, then again inwardly through a passage 78, again against the impeller vanes 52a, into the passage 57, thence outwardly, passing the third time against impeller vanes 52a of the rotor, and finally will be exhausted through the passages 81 and 80 from the engine, if the force of the expanding gas has not been entirely expended.

While I have shown only the two bands of impeller vanes, it will be understood that a succession of bands corresponding to the second mentioned might be provided if such should be desired.

As a detail of the present construction, it will be mentioned that it is desirable that the fuel charge in any combustion chamber be held under compression during the initial igniting period, and therefore the first impeller vane in the semi-circular series of vanes 52 is of a particular design and mounting, as will be understood by reference to Figs. 7 and 8. This vane is pivotally supported adjacent its outer end by a pivot pin 90, and has a flat shoulder 91 adapted to lie flush with the circumference of the ring 10. The pivot pin 90 is fixed to the vane and extends rotatably within bearings of the ring with one end contained within a pocket 92, as shown in Fig. 8, where a coiled spring 93 is affixed to this extended end of the pin and bears against a wall of the pocket in such manner as to yieldingly hold the vane in position that the outer end surface will operate as a closure for the passage 50 at the instant the fuel charge is ignited. However, the force of the ignited charge will rock the vane on its pivot mounting to the open position as shown in dotted lines, and the force can be expended through the adjacent passage 52 into the passage 56.

Engines of this kind may be made in various sizes, according to requirements, and, as previously stated, the rotor may be equipped with two or more of the bands of impeller vanes, as desired to suit any particular purpose.

Having thus described my invention, what I claim as new therein and desire to secure by Letters Patent is—

1. In an engine of the character described, a casing, a rotor shaft revolubly mounted therein, a rotor fixed on the shaft for driving it and having a cylindrical flange revolubly fitted to the casing wall and formed with a circumferentially directed band of impeller vanes and passages intermediate the vanes, a segmental annular member fixed against rotation in the housing and fitted to the inside of the flange, means for expanding the segmental member to yieldingly press its parts into close joining contact with the cylindrical flange, a plurality of combustion chambers, means for the synchronous admission of fuel charges thereto, means for a successive exploding of the charges in the chambers, a discharge passage from each chamber, through the casing wall and directed tangentially against the band of impeller vanes; said segmental member having return passages therein corresponding to the several cylinders, with opposite ends adapted to register with the band of impeller passages of the rotor flange for the redirecting of combusting fuel charges outwardly through the flange after the initial delivery to impart a second driving impulse to the rotor.

2. An engine of the character described comprising a casing, a rotor shaft revolubly mounted in the casing, a rotor fixed against relative rotation on the shaft and having a cylindrical flange fitted revolubly in the casing and formed with a series of laterally spaced circumferentially directed bands of impeller vanes and with passages through the flange between the vanes; the first of the series of bands of impellers being extended only partially about the cylinder, a segmental member fixed against rotation in the casing and fitted to the inside of the cylindrical flange, means for applying a yielding outward pressure against the segmental members to effect a close fitting joint, a plurality of combustion chambers, means synchronized with rotation of the rotor shaft for admitting fuel charges to the chambers, means for compressing the fuel charges therein and means for igniting the charges, delivery passages from the chambers directed tangentially against the rotor in the plane of the partial band of impellers and passages; said casing and said non-rotary segmental member having return passages therein whereby combusting fuel charges are progressively advanced from the first of the series successively to the other bands of impellers in the series.

ELWOOD H. WRIGHT.